United States Patent
Schwager et al.

(10) Patent No.: US 8,401,062 B2
(45) Date of Patent: Mar. 19, 2013

(54) METHOD OF TRANSMITTING DATA AND MODEM

(75) Inventors: Andreas Schwager, Waiblingen (DE); Dietmar Schill, Winnenden (DE); Lothar Stadelmeier, Stuttgart (DE)

(73) Assignee: SONY Deutschland GmbH, Berlin (DE)

( * ) Notice: Subject to any disclaimer, the term of this patent is extended or adjusted under 35 U.S.C. 154(b) by 655 days.

(21) Appl. No.: 12/524,878

(22) PCT Filed: Sep. 5, 2007

(86) PCT No.: PCT/EP2007/007753
§ 371 (c)(1),
(2), (4) Date: Jul. 29, 2009

(87) PCT Pub. No.: WO2008/101523
PCT Pub. Date: Aug. 28, 2008

(65) Prior Publication Data
US 2010/0027600 A1    Feb. 4, 2010

(30) Foreign Application Priority Data
Feb. 22, 2007    (EP) .................................. 07003693

(51) Int. Cl.
*H04B 1/38* (2006.01)
(52) U.S. Cl. ........................................ 375/222
(58) Field of Classification Search .................. 375/222, 375/296, 298
See application file for complete search history.

(56) References Cited

U.S. PATENT DOCUMENTS

| | | | | |
|---|---|---|---|---|
| 5,930,301 A * | 7/1999 | Chester et al. ................. | 375/296 |
| 6,904,099 B1 * | 6/2005 | Kinase et al. ................. | 375/279 |
| 7,003,231 B2 * | 2/2006 | Way et al. ..................... | 398/186 |
| 2007/0076813 A1 * | 4/2007 | Haartsen ....................... | 375/285 |
| 2010/0195744 A1 | 8/2010 | Schwager et al. | |

OTHER PUBLICATIONS

Eberle, W. et al., "80-Mb/s QPSK and 72-Mb/s 64-QAM Flexible and Scalable Digital OFDM Transceiver ASICs for Wireless Local Area Networks in the 5-GHz Band", IEEE Journal of Solid-State Circuits, vol. 36, No. 11, pp. 1829-1838 (2001) XP-011061618.
Austalian Communications Authority, "The Management of Interference From Broadband Over Power Lines the Possible Introduction and Regulation of Broadband Over Powerline Systems (BPL/PLC) Discussion Paper", Retrieved From the Internet: URL: http://www.acma.gov.au/webwr/_assets/main/lib100047/no179%20bastin.pdf, pp. 1-15 (2005) XP-002439511.
Office Action issued Jul. 4, 2011 in Russian Patent Application No. 2009135265/08(049670) (with English translation).
U.S. Appl. No. 12/940,638, filed Nov. 5, 2010, Schwager, et al.
U.S. Appl. No. 12/940,567, filed Nov. 5, 2010, Schwager, et al.
U.S. Appl. No. 12/945,348, filed Nov. 12, 2010, Schwager, et al.
U.S. Appl. No. 13/502,774, filed Jun. 11, 2012, Schwager, et al.
Chinese Office Action issued Mar. 31, 2012, in China patent Application No. 200780051561.2 (with English translation).

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

A method, and corresponding modem, of transmitting data. The method including: modulating the data onto a plurality of carriers with different carrier frequencies, resulting in a transmission signal; notching predetermined frequency bands of the transmission signal, which predetermined frequency bands would otherwise disturb external transmissions; and boosting carriers that are adjacent to the predetermined frequency bands and that would be attenuated because of the notching.

9 Claims, 3 Drawing Sheets

METHOD OF TRANSMITTING DATA AND MODEM

TECHNICAL FIELD

The invention relates to a method for transmitting data and to a modem.

BACKGROUND OF THE INVENTION

Powerline communication (PLC) might have interferences to fixed radio broadcasting or other external transmissions. Today, PLC modems have fixed notch filters for amateur radio bands. Filters for fixed notches can be implemented with a high suppression and very steep slopes. Concepts of dynamic or smart notching enables PLC modems to detect an ingress of fixed radio broadcast stations. The frequencies where radio stations have been detected shall be omitted by PLC. In order to realize this in a PLC transmitter, adaptive notch filters for suppressing a transmission signal in a predetermined frequency band might be used. These adaptive notch filters also attenuate carriers adjacent or neighbored to said predetermined frequency bands, because notch filters for dynamic suppression of frequencies have weaker slopes, especially if there are many individual frequencies to be notched.

SUMMARY OF THE INVENTION

It is an object of the present invention to provide a method for transmitting data and a modem, which enhances properties of adaptive notch filtering for the purpose of PLC systems.

The object is solved by a method of transmitting data, comprising:
  modulating said data onto a plurality of carriers with different carrier frequencies, resulting in a transmission signal;
  notching predetermined frequency bands of said transmission signal, which predetermined frequency bands would otherwise disturb external transmissions; and
  boosting carriers which are adjacent to said predetermined frequency bands and which would be attenuated because of said notching step.

In a further aspect the object is solved by a modem, comprising:
  a plurality of modulators each configured to modulate input data onto one of a plurality of carriers;
  a plurality of amplifiers each connected to one of said plurality of modulators;
  a transformation unit, connected to said amplifiers and configured to sum up signals from each of said amplifiers to generate a transmission signal;
  a notch filter connected to said transformation unit, said notch filter being configured to notch predetermined frequency bands of said transmission signal;
  a notch control unit connected to said notch filter and connected to said amplifiers, said notch control unit being configured to adjust the amplification of said amplifiers in correspondence to said predetermined frequency bands.

BRIEF DESCRIPTION OF DRAWINGS

The above and other objects, features and advantages of the present invention will become more apparent from the following description of the presently preferred exemplary embodiments of the invention taken in conjunction with the accompanying drawings, in which.

DETAILED DESCRIPTION

In order to implement flexible notch filters Infinite Impulse Response (IIR)-Filters are used. A corresponding filter structure is implemented fixed in hardware. The filter coefficients are programmed during operation. The number of notches that have to be implemented and the frequency bands that have to be notched are decided after an ingress detection of radio services by an antenna and a corresponding measuring unit of the modem or by snooping noise ingress at mains of powerline systems. The hardware filter structure has to be general for all filter frequencies and filter bandwidth. Usually this generic filters have weak slopes and attenuate the neighboring or adjacent carriers of an Orthogonal Frequency Division Multiplexing (OFDM)-scheme used within PLC modems.

Figure 1:
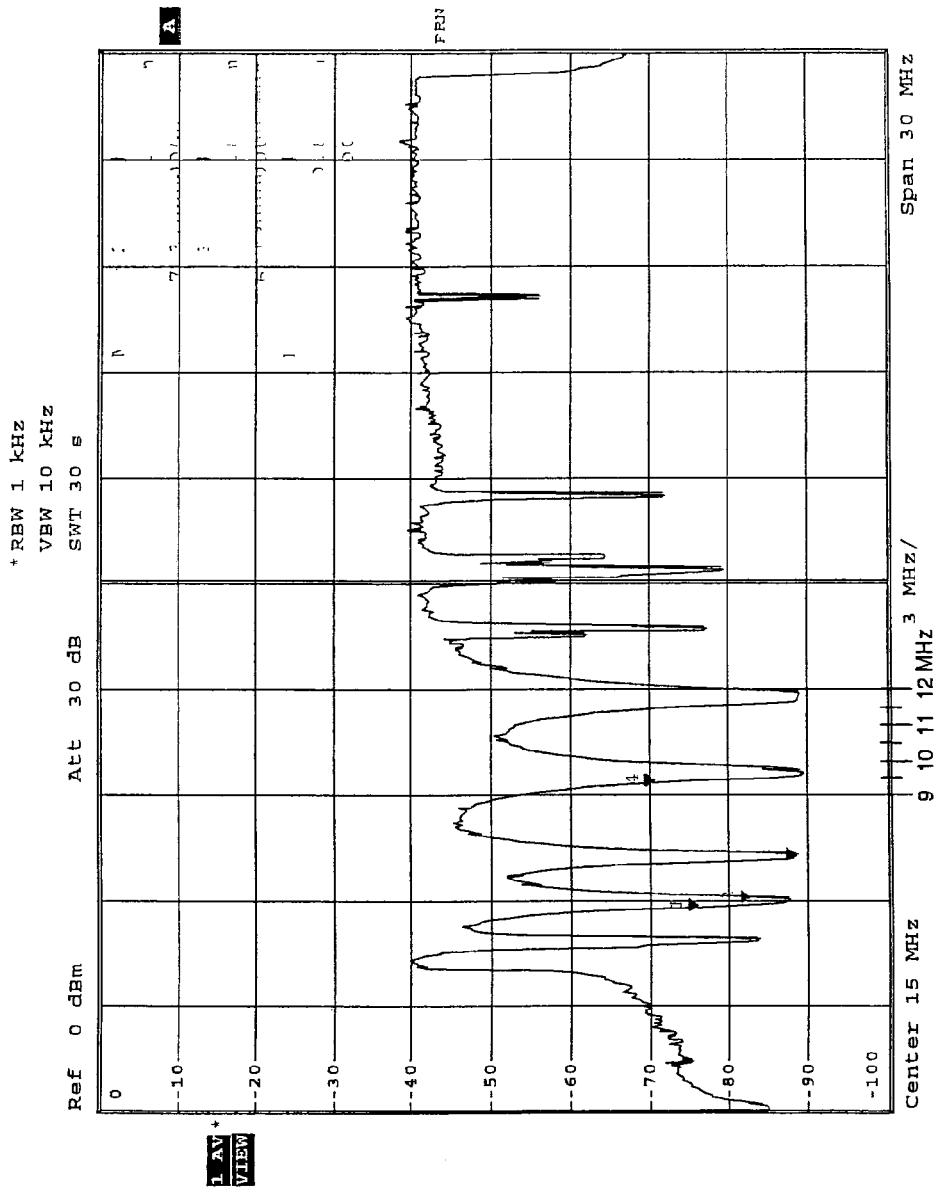
FIG. 1 is showing a spectrum of a transmitted signal with multiple notches.

FIG. 1 shows an example of a transmission spectrum of a transmission signal, where some flexible notch filters omit frequencies. The original Power Spectral Density (PSD) shall be −40 dBm measured with a resolution bandwidth (ResBW) of 1 kHz. For instance in FIG. 1 the frequencies around 10.2 MHz to 11 MHz should have a transmit PSD of −40 dBm. Due to the side suppression of notch filters at 9.5 MHz and 11.7 MHz the communication spectrum around 10.2 MHz to 11 MHz is attenuated by 10 dB or more.

Figure 2:
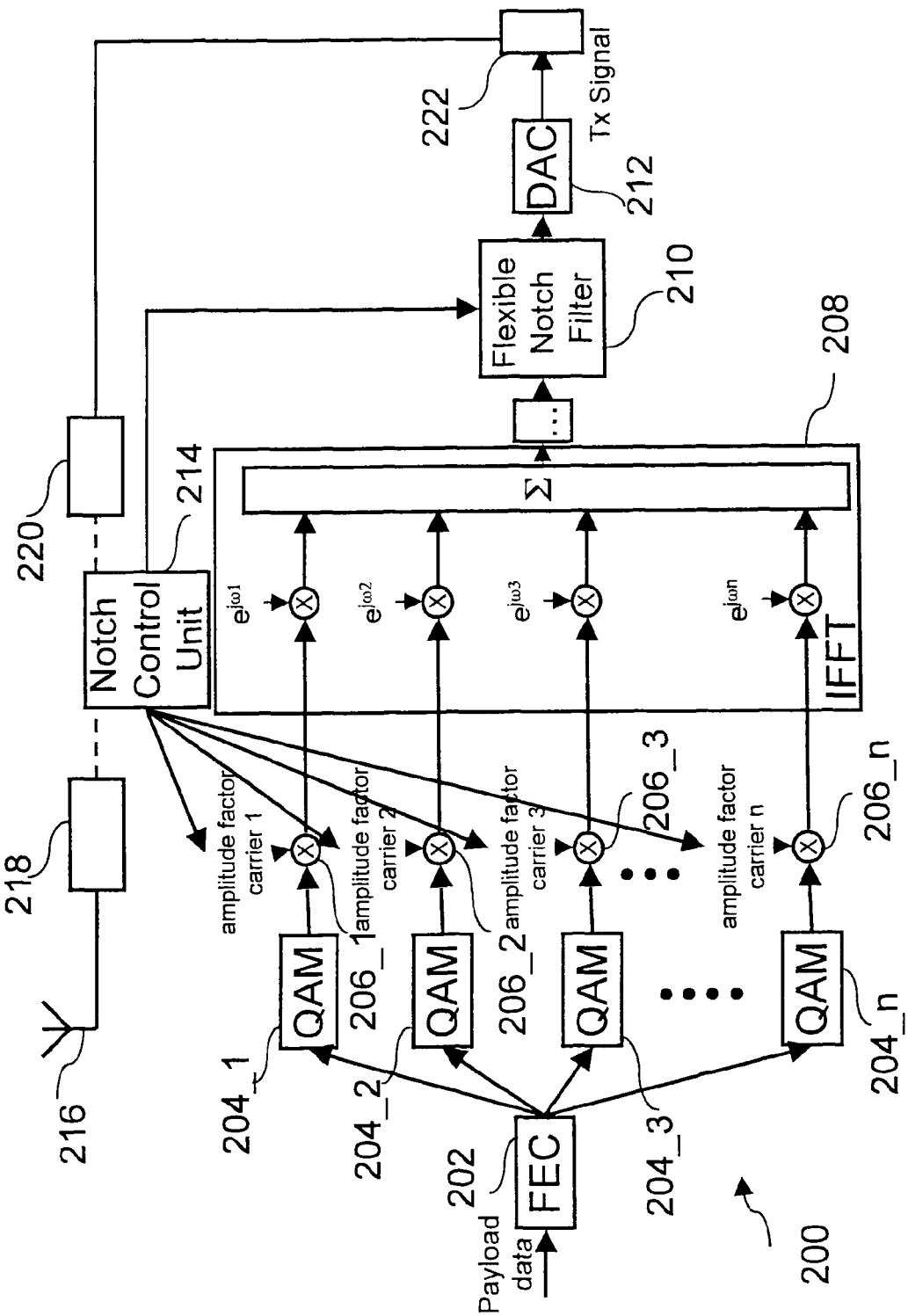
FIG. 2 is showing schematically a block diagram of a modem with an adaptive notch filter.

With a modem 200 as depicted in FIG. 2 OFDM carriers at carrier frequencies around 10 MHz to 11 MHz can be amplified, boosted or pre-distorted by at least approximately the same amount as the weak slopes of the notch filters attenuate them. In this embodiment all transmitted carriers would have identical power spectral density. This raises the signal-to-noise ratio (SNR) at a receiver and enables at an adaptive OFDM system the use of higher constellations of a carrier involved.

In FIG. 2 an OFDM part of a modem 200 is schematically depicted, where amplitudes of carriers could be adjusted individually. Payload data is transmitted to a Feed Forward Error Correction (FEC) Unit 202. Afterwards, a plurality n of corresponding Quadrature Amplitude Modulators (QAM) 204_1, 204_2, 204_3, . . . , 204_n maps information of the Individual bits to its complex constellation points. Each of the Quadrature Amplitude Modulators (QAM) 204_1, 204_2, 204_3, . . . , 204_n is connected to one of a plurality n of amplifiers 206_1, 206_2, 206_3, . . . , 206_n and a corresponding carrier of a plurality n of carriers is multiplied by an amplitude factor of said amplifier. Carriers, which are known to be notched, may already become suppressed at this stage and are not injected into summation. All active carriers are summed in a transformation unit 208, e.g. an Inverse Fast Fourier Transformation (IFFT)-unit, and a transmission signal in time domain is generated. Due the weak side loop suppression of OFDM systems this signal will be filtered additionally by a flexible notch filter 210 and afterwards digital-to-analog converted by an digital-to-analog converter (DAC) 212 and transmitted to a corresponding receiver (not depicted).

The flexible notch filter 210 can also attenuate frequencies adjacent to the notched frequency band. This unwanted side-attenuation can be compensated by a pre-amplification of the affected carrier.

The depicted embodiment of the OFDM system is able to set an amplitude of each carrier individually. This may be achieved by multiplying each affected carrier after the corresponding QAM mapper 204_1, 204_2, 204_3, ..., 204_n with its amplitude factor. This multiplication boosts or amplifies the carrier by an amount identical or at least approximately identical to the amount of attenuation of this carrier resulting from the flexible notch filter 210. The value of attenuation for each carrier resulting from the flexible notch filter 210 can be derived from the frequency response of the flexible notch filter 210.

This embodiment ensures that the carriers are boosted to their original (not attenuated) level. Therefore, an amplification of the PSD beyond regulatory limits can be avoided.

A notch control unit 214 is provided, which is connected to the flexible notch filter 210 and the amplifiers 206_1, 206_2, 206_3, ..., 206_n, the notch control unit 214 being configured to set the filter coefficients of the flexible notch filter 210, to calculate the frequency response of the filter 210 and to boost or amplify the attenuated carriers by setting a corresponding amplitude factor. The notch control unit 214 may be connected to an antenna 216 and a corresponding first measuring unit 218 in order to determine frequency bands of external transmissions like e.g. radio amateur frequency bands or radio transmissions from radio stations, e.g. on short wave channels. Another embodiment which is depicted as well in FIG. 2 comprises a further measuring unit 220, which is configured to snoop noise ingress on mains 222 in order to determine said frequency bands. The modem 200 may comprise the antenna 216 and the first measuring unit 218 and/or the further measuring unit 218 alternatively or in combination, which is depicted schematically by the use of broken lines.

These measured frequency bands can be used to correspondingly determine said filter coefficients of said flexible notch filter 210, so that corresponding parts of the transmission signals are notched and the corresponding amplitude factors are accordingly adjusted.

Figure 3:
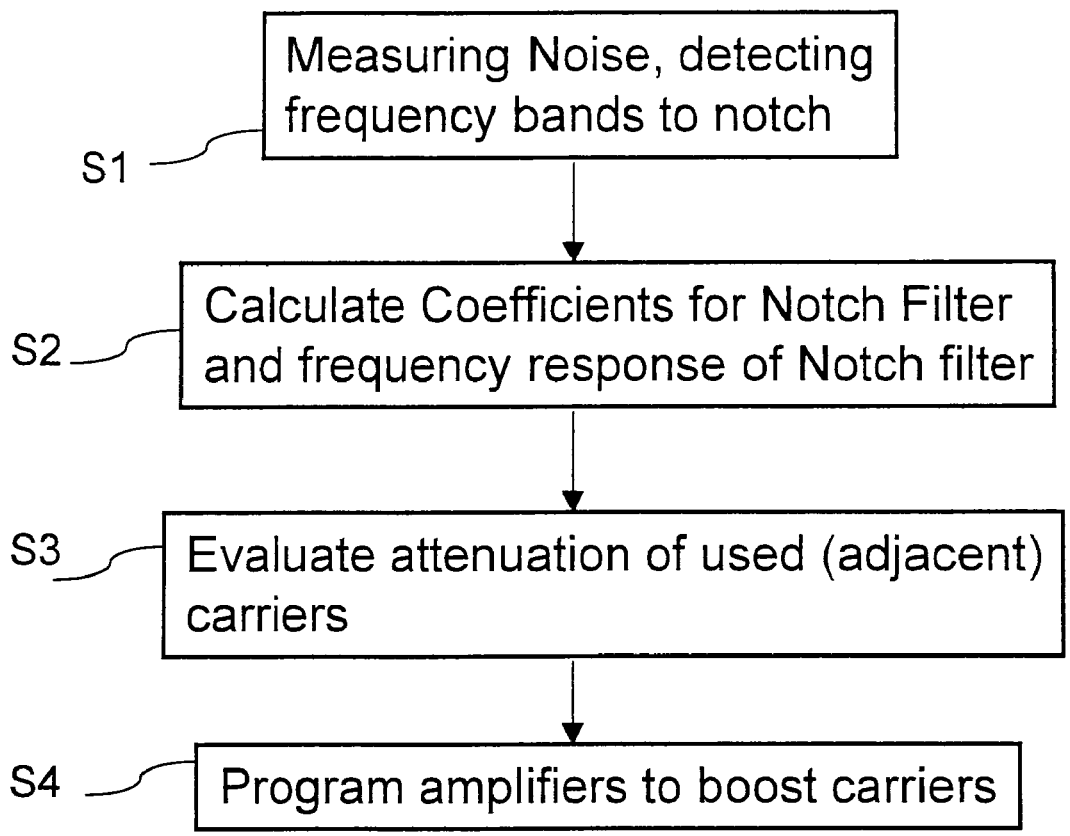
FIG. 3 is showing schematically a block diagram of features of a method for transmitting data.

In FIG. 3 a schematically block diagram for the method of transmitting data is depicted. In a first step S1 the noise ingress is measured and the frequency bands which should be notched are detected. In a second step S2 filter coefficients for the notch filter 210 are calculated and the corresponding frequency response of the notch filter 210 is determined. In a third step S3 an attenuation of used adjacent carriers due to this frequency response is evaluated and in a fourth step S4 the amplifiers 206_1, 206_2, 206_3, ..., 206_n are programmed to boost the carriers.

REFERENCE SYMBOLS

200 Modem
202 Forward Error Correction Unit
204_1, 204_2, Quadrature Amplitude Modulator QAM
204_3, ..., 204_n
206_1, 206_2, Amplifier
206_3, ..., 206_n
208 Inverse Fast Fourier Transformation Unit
210 Flexible Notch Filter
212 Digital to Analog Converter
214 Notch Control Unit
216 Antenna
218 Measuring Unit
220 Further Measuring Unit
222 Mains
S1 First Step
S2 Second Step
S3 Third Step
S4 Fourth Step

The invention claimed is:

1. A method of transmitting data, comprising:
modulating said data onto a plurality of carriers with different carrier frequencies, resulting in a transmission signal;
notching predetermined frequency bands of said transmission signal, which predetermined frequency bands would otherwise disturb external transmissions;
determining an amount of attenuation for carriers that are adjacent to said predetermined frequency bands and that would be attenuated because of said notching; and
boosting said carriers by said determined amount.

2. A method according to claim 1, wherein
said predetermined frequency bands of the transmission signal are predetermined by evaluating, which frequency bands of said transmission signal would disturb external transmissions.

3. A method according to claim 1, further comprising:
measuring frequency bands of external transmissions;
adjusting said predetermined frequency bands to said measured frequency bands; and
adjusting said boosting to carriers adjacent to said adjusted predetermined frequency bands.

4. A modem for transmitting data, comprising:
a plurality of modulators each configured to modulate input data onto one of a plurality of carriers;
a plurality of amplifiers each connected to one of said plurality of modulators;
a transformation unit, connected to said amplifiers and configured to sum up signals from each of said amplifiers to generate a transmission signal;
a notch filter connected to said transformation unit, said notch filter being configured to notch predetermined frequency bands of said transmission signal; and
a notch control unit connected to said notch filter and connected to said amplifiers, said notch control unit being configured to adjust the amplification of said amplifiers in correspondence to said predetermined frequency bands.

5. A modem according to claim 4, wherein
said notch control unit is configured to adjust the amplification of carriers falling within said predetermined frequency bands to zero.

6. A modem according to claim 4, wherein
said notch control unit is configured to adjust the amplification of a carrier adjacent to said predetermined frequency bands to an amount approximately equal to an amount of attenuation of said adjacent carrier due to said notch filter.

7. A modem according to claim 4, further comprising:
an antenna and a corresponding measuring unit for measuring frequency bands of external transmissions; and
wherein said notch control unit is configured to adjust said notch filter to notch frequency bands of said transmission signals falling within said measured frequency bands and is further configured to adjust said amount of amplification to said adjusting of said notch filter.

8. A modem according to claim 4, further comprising:
a further measuring unit configured to measure frequency bands of noise ingress on mains of a powerline system; and wherein said notch control unit is configured to adjust said notch filter to notch frequency bands of said transmission signals falling within said measured frequency bands and is further configured to adjust said amount of amplification to said adjusting of said notch filter.

9. A modem according to claim 4, wherein said transformation unit is built as an inverse fast fourier transformation unit.

* * * * *